United States Patent
Jayanna

(10) Patent No.: US 8,396,444 B2
(45) Date of Patent: Mar. 12, 2013

(54) METHOD AND SYSTEM OF PSAP CALL BACK OF IN SUBSCRIBER

(75) Inventor: Shivaraju Jayanna, Frisco, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1374 days.

(21) Appl. No.: 12/098,553

(22) Filed: Apr. 7, 2008

(65) Prior Publication Data

US 2009/0253400 A1    Oct. 8, 2009

(51) Int. Cl.
H04M 11/04    (2006.01)

(52) U.S. Cl. ..................................... 455/404.1; 370/338
(58) Field of Classification Search ............... 455/404.1; 370/338
See application file for complete search history.

(56) References Cited

U.S. PATENT DOCUMENTS

| 5,467,388 | A | 11/1995 | Redd, Jr. et al. |
| 6,249,674 | B1 | 6/2001 | Verdonk |
| 7,983,652 | B1 * | 7/2011 | Hursey et al. ............. 455/404.1 |
| 2005/0286701 | A1 | 12/2005 | Suvanne et al. |
| 2007/0149166 | A1 | 6/2007 | Turcotte et al. |

* cited by examiner

Primary Examiner — Marcos Batista

(57) ABSTRACT

A method and system for re-establishing a connection from a PSAP or 911 call center to a terminal of a 911 caller who has subscribed to IN services, for example, after a terminal of a 911 caller has been disconnected from the PSAP or 911 call center. If the call is dropped, the PSAP or 911 call center can, manually, or automatically via the system of the present invention, dial or cause to be dialed, a pre-determined prefix prior to dialing the number of the terminal of the 911 caller. In a separate embodiment of the method and system of the present invention, a separate parameter is used in CAMEL IDP and ISUP IAM to indicate the calling party category to identify that the call is originating from a PSAP or 911 call center.

2 Claims, 9 Drawing Sheets

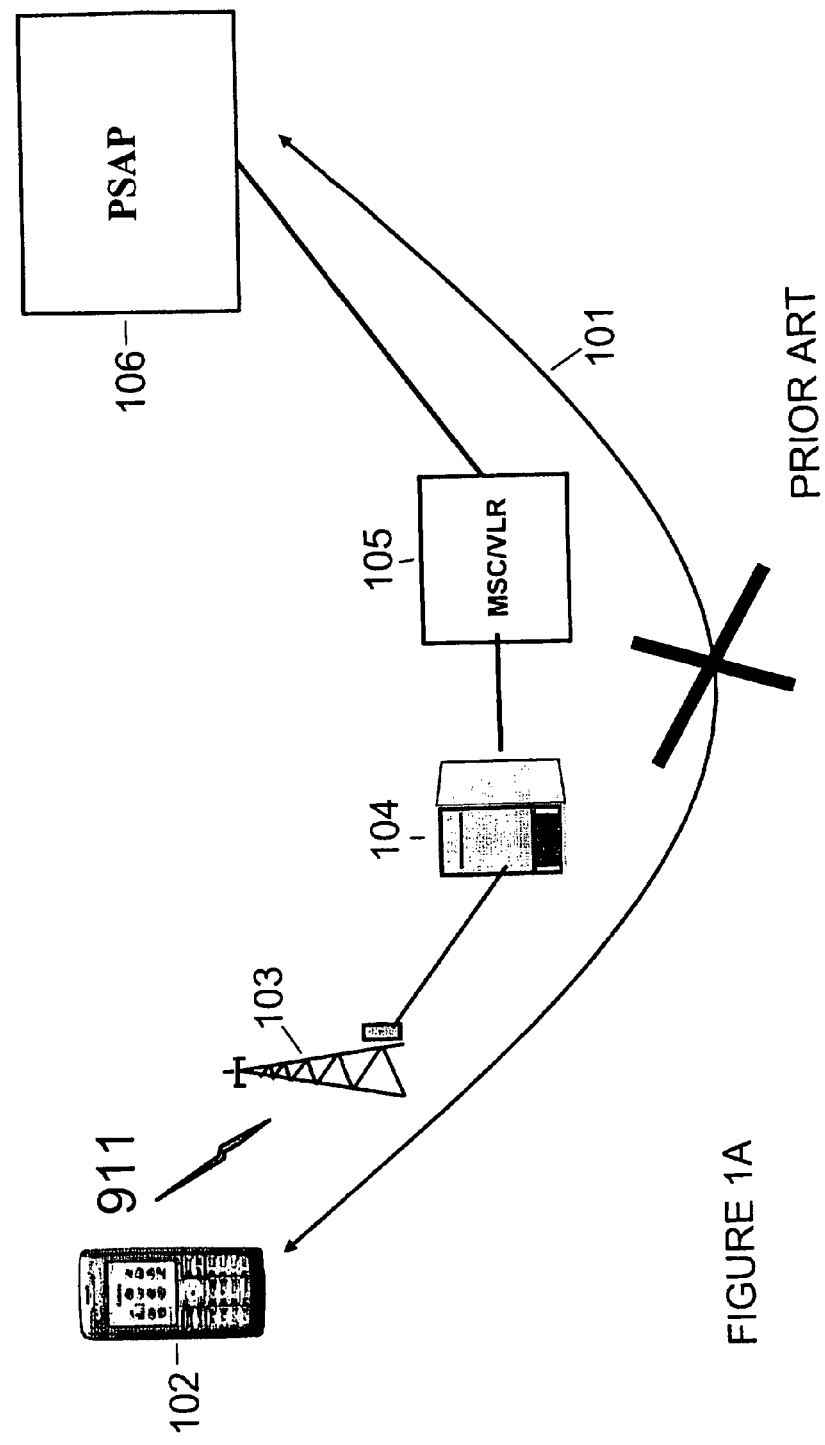

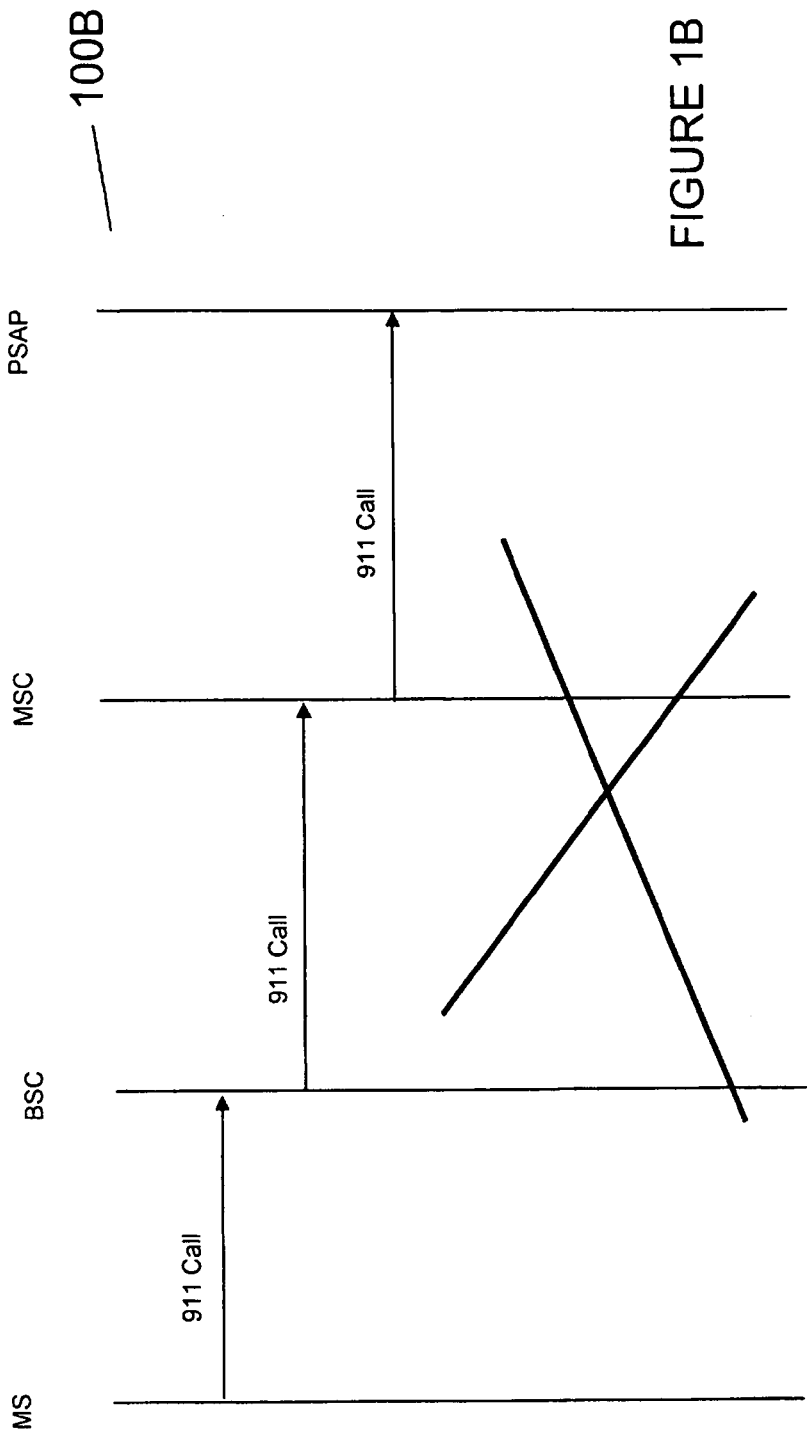

METHOD AND SYSTEM OF PSAP CALL BACK OF IN SUBSCRIBER

BACKGROUND

The acronyms used herein shall have the following meanings:
- Ack—Acknowledge
- BS—Base Station
- BSC—Base Station Controller
- CAMEL—Customized Applications for Mobile Network Enhanced Logic
- DP—Detection Point
- GMSC—Gateway Mobile Switching Center
- GSM—Global System for Mobile Communications
- HLR—Home Location Register
- IAM—Initial Address Message
- IDP—Initial Detection Point
- IN—Intelligent Network
- ISUP—ISDN User Part
- IXC—Inter Exchange Carrier
- LEC—Local Exchange Carrier
- MAP—Mobile Application Part
- MSC—Mobile Switching Center
- MSISDN—Mobile Station International Subscriber Directory Number
- MSRN—Mobile Subscriber Roaming Number
- MTP—Message Transport Part
- PSAP—Public Safety Answering Point
- RRB—Request Report BCSM Event
- SCCP—Signaling Connection and Control Part
- SCP—Service Control Point
- SDP—Service Data Point
- SSF—Service Switching Function
- SK—Service Key
- SP—Signaling Point
- SRI—Send Routing Information
- SSF—Service switching Function
- T-CSI—Terminating CAMEL Subscription Information
- VLR—Visitor Location Register
- V-MSC Visiting MSC
- VoIP—Voice over Internet Protocol Public Safety Answering Points (PSAPs), also known as 911 call centers, are the public's first line of contact with public safety authorities in an emergency situation. The term "911" shall not be construed as being limited to calls signaled using the digits "911" as these digits are used to generically refer to any signaling to an emergency call center. Dialing 911 from a terminal quickly connects callers to a PSAP dispatcher. In the event a 911 call from a terminal is dropped or cut-off, it is standard procedure for the PSAP dispatcher to attempt to re-establish the connection with the terminal of the 911 caller by calling the same number received in the 911 call report.

However, there are situations where a PSAP or 911 call center may have difficulty re-establishing the connection with the terminal of the 911 caller, particularly if the terminal of the 911 caller is subscribed to IN services, due to restrictions that are placed on the IN subscriber side. Such restrictions may include parental control restrictions, insufficient pre-paid credit or available minutes. In such case, the terminal of the IN subscriber may be restricted in making or receiving calls to and from certain numbers even though the subscriber service is still active. For example, a terminal of a IN subscriber may be allowed to make certain outgoing calls, such as to a customer care number, 911 or certain 1-800 numbers or receive incoming calls, such as from 611, certain 1-800 numbers, and numbers that are always allowed or that are free of charge.

FIG. 1A illustrates a dropped 911 call 101 made from a terminal 102 subscribed to IN services, the call initially having been routed from terminal 102, to BS 103 through BSC 104 and MSC/VLR 105 to PSAP 106. FIG. 1B is a message flow diagram 100B illustrating the problem of a dropped 911 call made from a terminal of a subscriber to IN services. FIG. 1C is a message flow diagram 100C illustrating an attempted call back to a 911 caller with IN services. But the PSAP will not be able to connect successfully with 911 Caller (B party) in case of various called Party IN services restrictions. E.g. insufficient pre-paid money or minutes, parental restrictions etc. Due to these various IN service restrictions Service does not allow the PSAP call to IN subscriber.

Conventionally, there is no method or system to allow a PSAP to re-establish a connection to a terminal of a 911 caller who is an IN subscriber in the event of a dropped call, if there are restrictions on the terminal of the subscriber as herein before described. Because PSAP numbers are numerous and unregulated, there is no method or system to distinguish a PSAP number for such callback purposes. Also, there is no method to identify the calls from PSAP numbers and tag them separately to allow the calls to be connected free of charge to the 911 caller.

In the event a terminal of a subscriber to an IN service has a parental control, the parent may only allow the terminal held by the child to receive calls from green listed numbers, which are calls from e.g., parents, relatives, or close friends, whereas calls from other numbers, such as a PSAP, may be red-listed or barred. Finally, the IN service could be configured to apply a time restriction on the connection of calls during certain periods of time or days of the week. For example, a parent might block incoming and/or outgoing calls to a terminal held by a child during school hours from Monday to Friday. These time restrictions may inhibit a PSAP from calling back a terminal of a 911 caller.

What is desired is a method and system for connecting a PSAP or 911 call center to a terminal of an IN subscriber without restriction.

SUMMARY

The present invention is a method and system for re-establishing a connection from a Public Safety Answering Point (PSAP) or 911 call centers to a terminal of a 911 caller, for example, after a 911 caller has been disconnected from the PSAP or 911 call center. In the present invention, when a caller uses a terminal to call 911, the PSAP or 911 call center receives a call report with the number of the terminal of the 911 caller. If the call is dropped, the PSAP or 911 call center can, manually, or automatically via the system of the present invention, dial or cause to be dialed, a pre-determined prefix prior to dialing the number of the terminal of the 911 caller. In this manner, the PSAP or 911 call center can obtain access to the terminal of the 911 caller, thus overcoming the disadvantages associated with conventional call treatment. For example, the PSAP or 911 call center system can dial or cause to be dialed: <prefix>MSISDN, such as 911#972-555-1111. Alternatively, the PSAP can manually add the prefix such as 911 then the number of the terminal of the 911 caller. In a separate embodiment of the method and system of the present invention, a separate parameter is used in CAMEL IDP and ISUP IAM to indicate the calling party category to identify the call from PSAP or 911 call centers. In a third embodiment of the present invention, an MSC or external box interfaced to the MSC identifies the terminal of the 911 calling party and communicates the identity to the IN network to authorize the terminal of the 911 caller to receive all incoming calls for the specified amount of time.

In the event that the embodiment of the present invention that uses manual dialing of a prefix is implemented, all PSAP dispatchers and first responders must be educated as to the dialing procedure to be used. In all of the embodiments of the present invention, the service provider core switches must be configured with the necessary data translations to receive and identify the prefix or the calling party category so as to permit the PSAP or 911 call center to cause a connection to be made to the terminal of the subscriber with the IN services.

There exist a variety of communication channels over which a PSAP dispatcher or 911 call center can call back the terminal of a 911 caller, including wireline, terrestrial wireless, Voice over Internet Protocol (VoIP) and/or mobile satellite services. Regardless of the manner in which the call back is made, it is critical that the telecommunications service provider have available mechanisms to ensure that there are no call failures in receiving incoming calls from a PSAP due to IN services restrictions. The present invention is described with reference to two major scenarios where the PSAP uses either a wireline or terrestrial wireless system to call back a 911 caller. The present invention is likewise adaptable to calls made to roaming subscribers.

BRIEF DESCRIPTION OF THE SEVERAL VIEWS OF THE DRAWINGS

FIG. 1A is a block diagram illustrating a dropped 911 call from a terminal of a subscriber with IN services:

FIG. 1B is a message flow diagram illustrating a 911 call from a terminal of a subscriber with IN services to a PSAP that has been dropped;

DETAILED DESCRIPTION

Figure 1C:
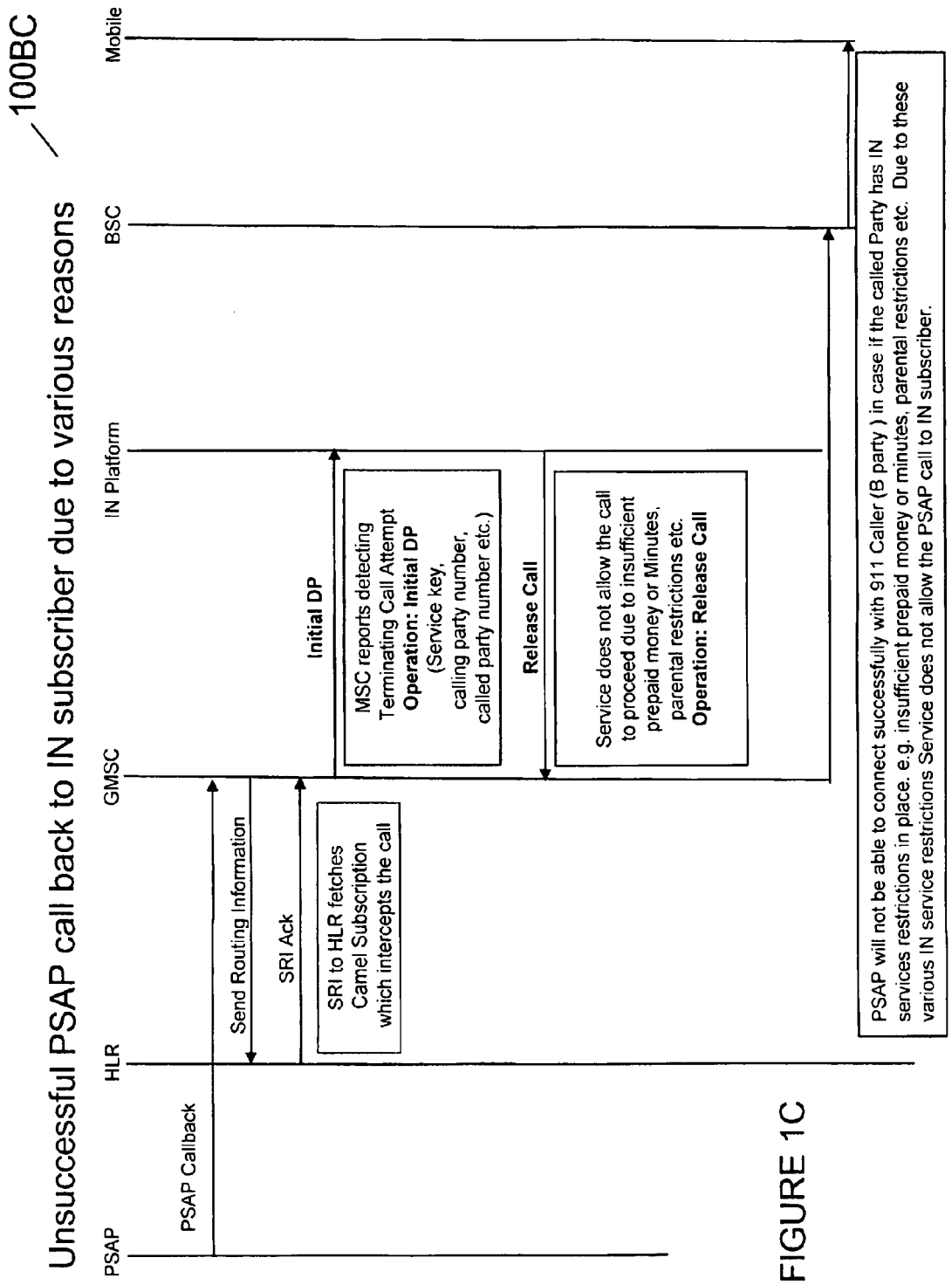
FIG. 1C is a message flow diagram illustrating an attempted call back from a PSAP to a terminal of a 911 caller with IN services.
Figure 2A:
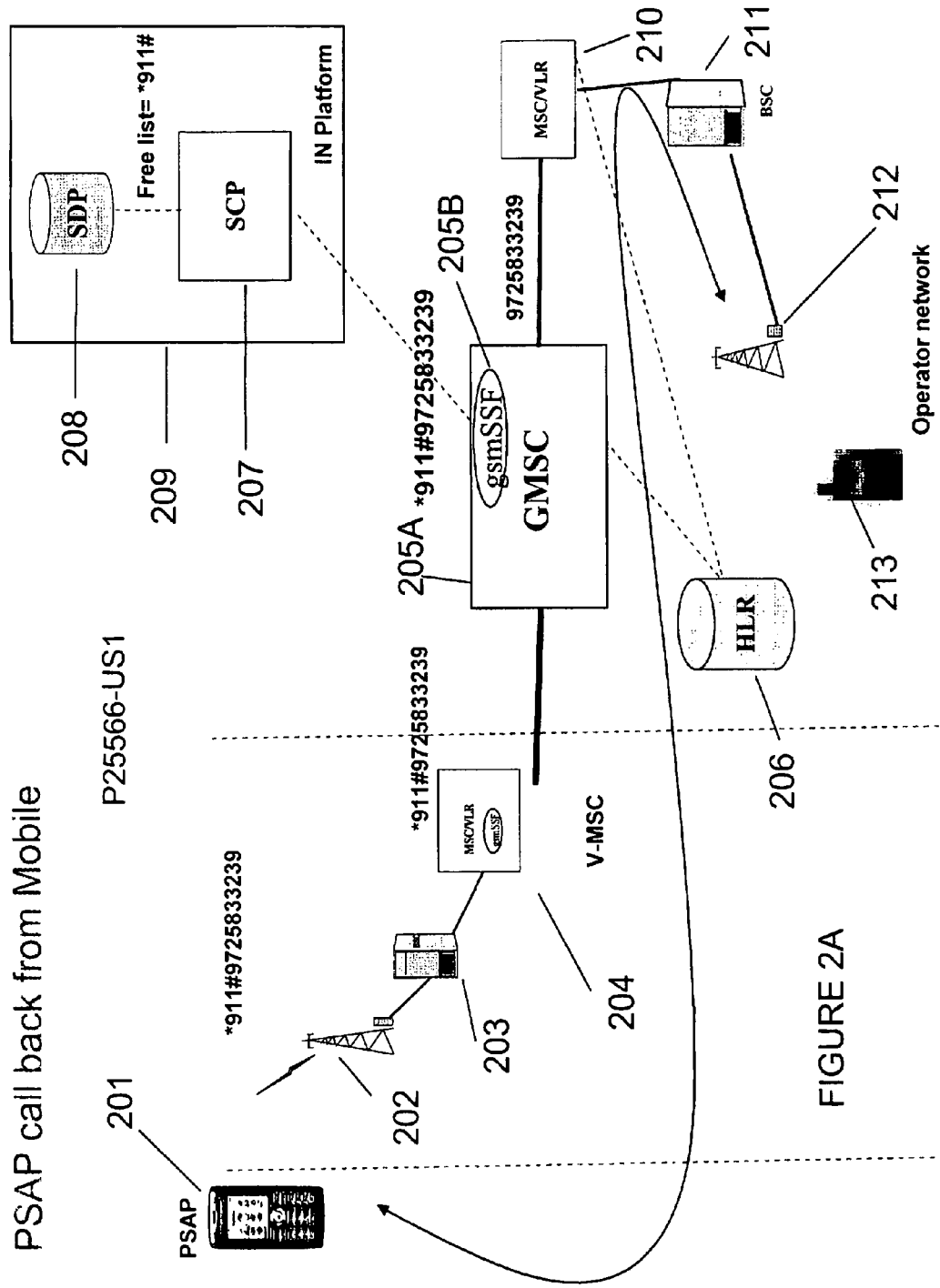
FIG. 2A is a block diagram of a call back from a PSAP terminal using a prefix to a terminal of a 911 caller having IN services according to an embodiment of the present invention.

Referring to FIG. 2A, a block diagram of a call back from a Public Safety Answering Point (PSAP) terminal using a prefix to a terminal of a 911 caller having Intelligent Network (IN) services according to an embodiment of the present invention is illustrated. As seen therein, terminal 201 of the PSAP dispatcher is used to dial a prefix or the PSAP dispatcher manually adds a prefix to the 911 calling party Mobile Station International Subscriber Directory Number (MSISDN) (the prefix and MSISDN being referred to as "digits") to connect the call to the terminal of the 911 caller who is the IN subscriber. The digits are first received, via the Base Station (BS) 202 and Base Station Controller (BSC) 203, in the Visiting Mobile Switching Center (V-MSC) 204. The V-MSC 204 analyzes the digits and routes the call to the Gateway Mobile Switching Center (GMSC) 205A being used by the terminal of the called subscriber without stripping or altering the prefix or the MSISDN. At the GMSC 205A, B-number (called party number) and Signaling Connection and Control Part (SCCP) analysis are performed. The global title "Routing Case" provides the Signaling Point (SP) of the Home Location Register (HLR) 206. The Mobile Application Part (MAP) message "Send Routing Information (SRI)" is sent to the HLR 206 by the Message Transport Part (MTP). The GMSC 205A receives Terminating CAMEL Subscription Information (T-CSI) data from HLR 206. The T-CSI data indicates that Customized Applications for Mobile Network Enhanced Logic (CAMEL) services are to be applied to mobile terminating calls and routing to the GSM Service Switching Function (gsmSSF) 205B is invoked. The Service Key (SK) which comes from HLR 206 data for CAMEL is sent from gsmSSF 205B to Service Control Point (SCP) 207 to identify the service to be invoked in the SCP 207. The SCP 207 sends interrogations about credit or remaining minutes associated with the terminal of the 911 caller to the Service Data Point (SDP) 208, to determine if a call is allowed and, if so, for how long. IN platform 209, an A-number (calling party number) prefix must be addressed in such a way that SCP 207 always allows the connection of a call with the prefix dialed by the PSAP in the call from the PSAP to a terminal of the 911 caller who is the IN subscriber. When the call has been routed through the SCP 207, the call set up will continue though the gsmSSF 205B, the B number analysis will be performed and the call will progress as normal to the terminal 213 of the B-subscriber, i.e., the 911 caller who is the IN subscriber, via the MSC/VLR 210, BSC 211. and BS 212.

Figure 2B:
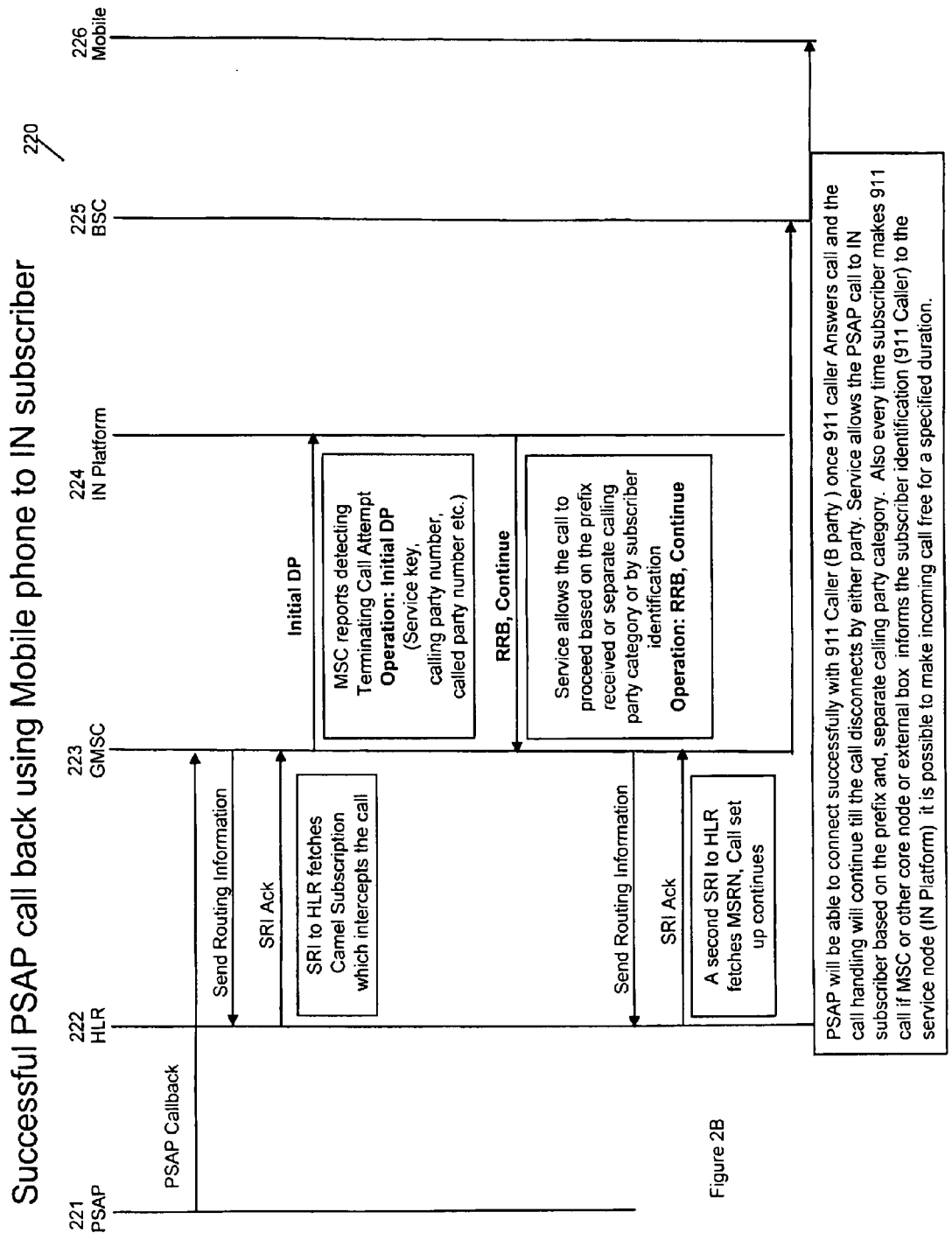
FIG. 2B is a message flow diagram of a callback from a PSAP to a terminal according to an embodiment of the present invention.

FIG. 2B is a message flow diagram 220 of a callback from a PSAP to a terminal according to an embodiment of the present invention. As seen therein, messages flow between and among the nodes PSAP 221, HLR 222, GMSC 223, IN Platform 224 BSC 225 and terminal 226. As seen therein, the present invention uses a prefix, separate calling party category or notification to service node about the 911 call from MSC or other core node or external node, this notification can in turn be used in service platform to allow all incoming calls to the 911 caller for a specified amount of time which helps the PSAP call to reach the terminal of the IN subscriber with restrictions.

Figure 3:
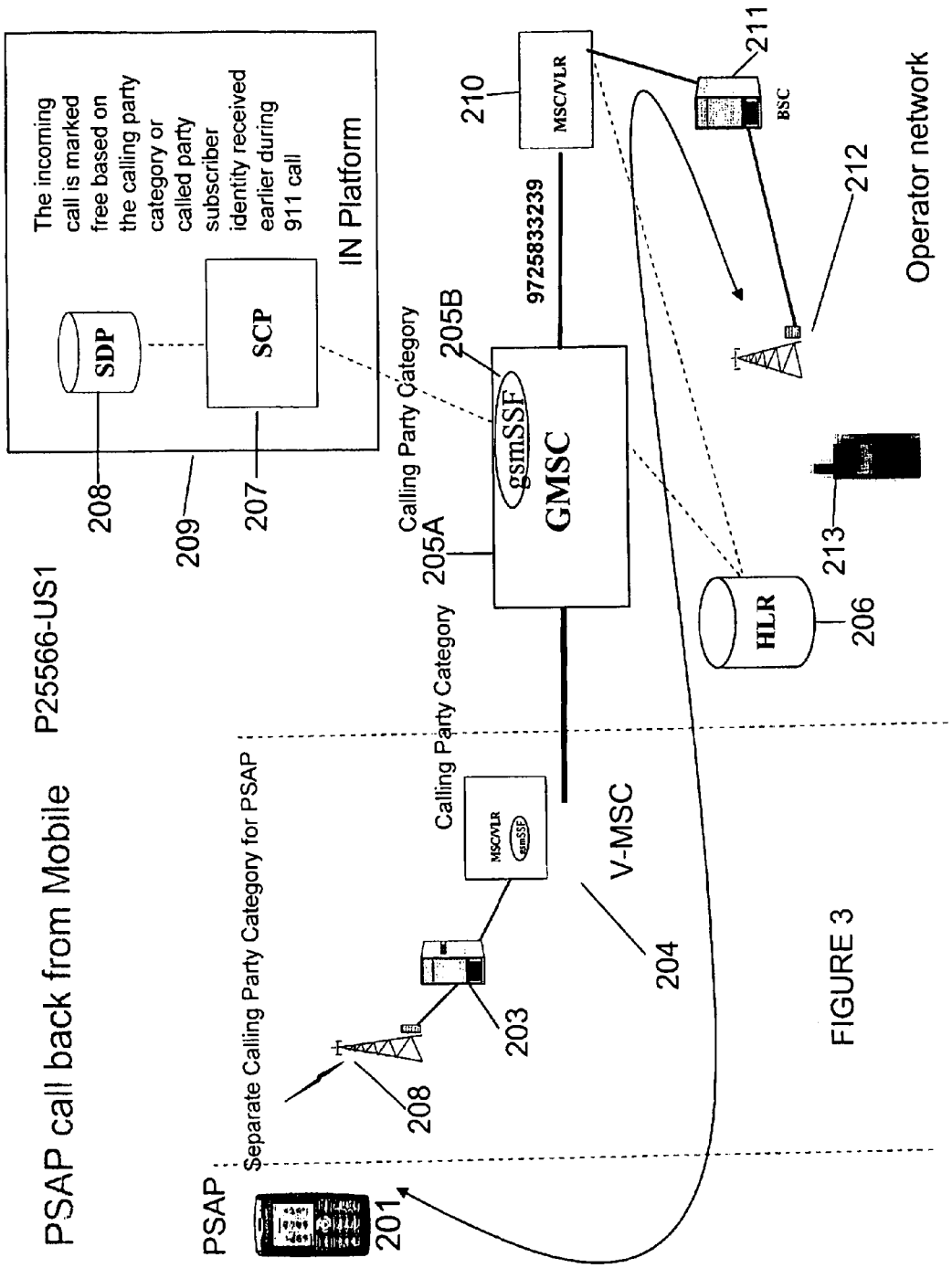
FIG. 3 is a block diagram of a call back from a PSAP mobile terminal using a separate calling party category to a terminal of a 911 caller having IN services according to an embodiment of the present invention.

FIG. 3 is a block diagram of a call back from a PSAP mobile terminal 201 using a separate calling party category to a terminal 213 of a 911 caller having IN services according to an embodiment of the present invention. As seen therein, terminal 201 of the PSAP dispatcher is used to assign a separate calling party category to connect the call to the terminal of the 911 caller who has subscribed to IN services. The category is received, via the BS 202 and BSC 203 in the V-MSC 204. The V-MSC 204 analyzes the calling party category and MSISDN and routes the call to the GMSC 205A used by the terminal 213 of the called subscriber without stripping or altering the calling party category or the MSISDN. At the GMSC 205A, B-number and SCCP analysis are performed. The global title "Routing Case" provides the SP of the HLR 206. The MAP message "Send Routing Information" is sent to the HLR 206 by the MTP and the GMSC 305A receives T-CSI data from HLR 206. The T-CSI data indicates that CAMEL services are to be applied to mobile terminating calls and routing to the gsmSSF 205B is invoked. The Service Key (SK) which comes from HLR 206 data for CAMEL is sent from gsmSSF 205B to SCP 207 to identify the service to be invoked in the SCP 207. The SCP 207 sends interrogations about a subscriber's credit or remaining minutes to the SDP 208, to check if a call is allowed and, if so, for how long. In the IN platform 209, the A-number must be addressed in such way that SCP 207 always allows the connection of a call with the PSAP calling party category in the call from the PSAP. When the call has been routed through the SCP 207, the call set up will continue though the gsmSSF 205B, the B number analysis is performed and the call progresses as normal to the terminal 213 of the B-subscriber being the 911 caller, via the MSCNLR 210, BSC 211, and BS 212.

Figure 4A:
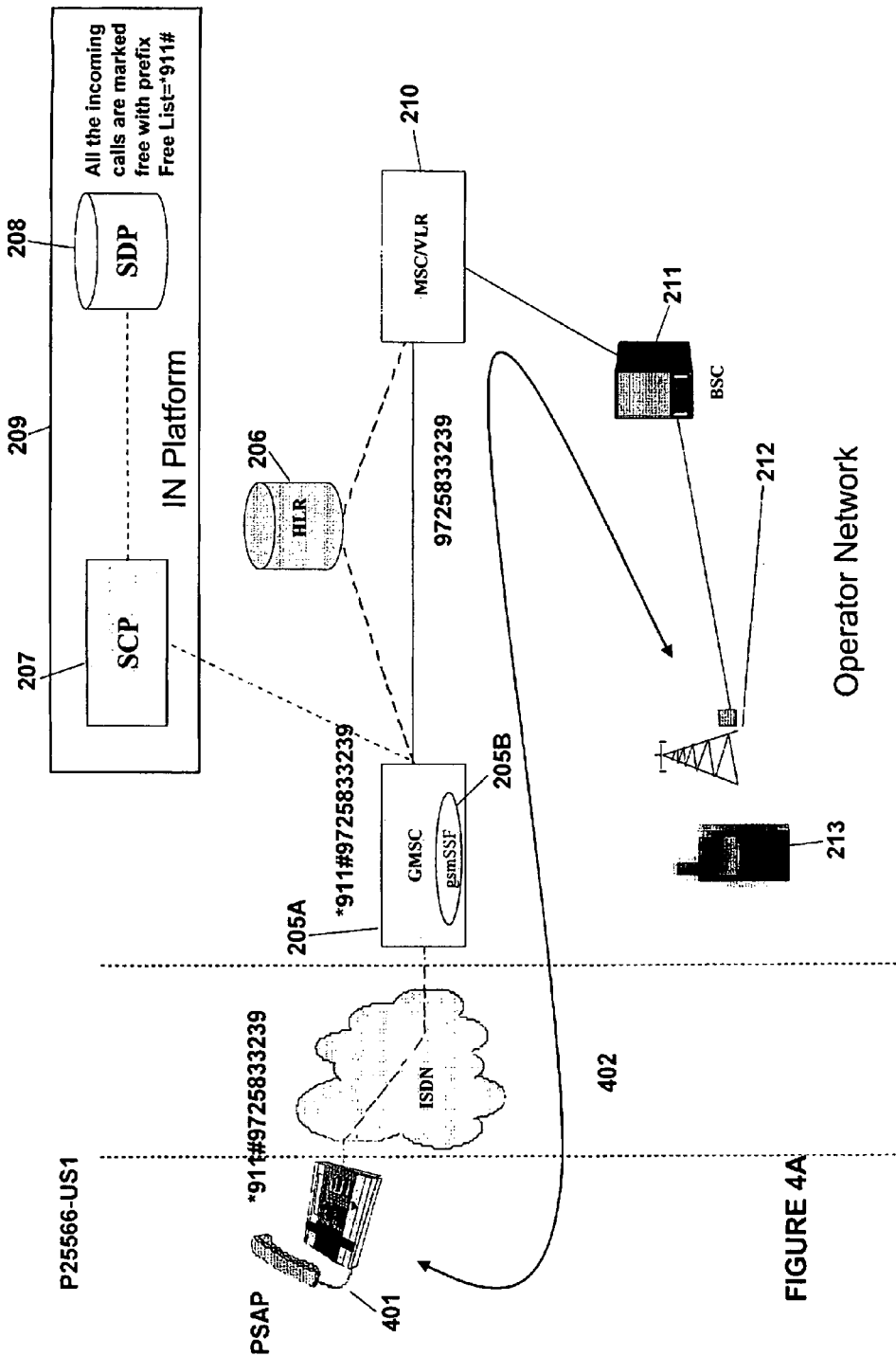
FIG. 4A is a block diagram of a call using a prefix from a fixed, wireline telephone of a PSAP to a terminal of a 911 caller having IN services according to an embodiment of the present invention.

FIG. 4A is a block diagram of a call using a prefix from a fixed, wireline telephone of a PSAP to a terminal of a 911 caller having IN services according to an embodiment of the present invention. In operation, the call is routed as seen in FIG. 2, provided that, initially, the PSAP, using a fixed, wireline terminal 401 dials the number of the terminal of the 911 caller along with the prefix and this, along with the MSISDN reaches the Local Exchange Carrier (LEC) 402. The LEC 402 uses data translations to receive these dialed digits, including the prefix, analyze the prefix and <MSISDN> and route them through the Inter Exchange carrier (IXC) as needed so that the prefix and the MSISDN reaches the GMSC 205A used by the terminal of the B-subscriber.

Figure 4B:
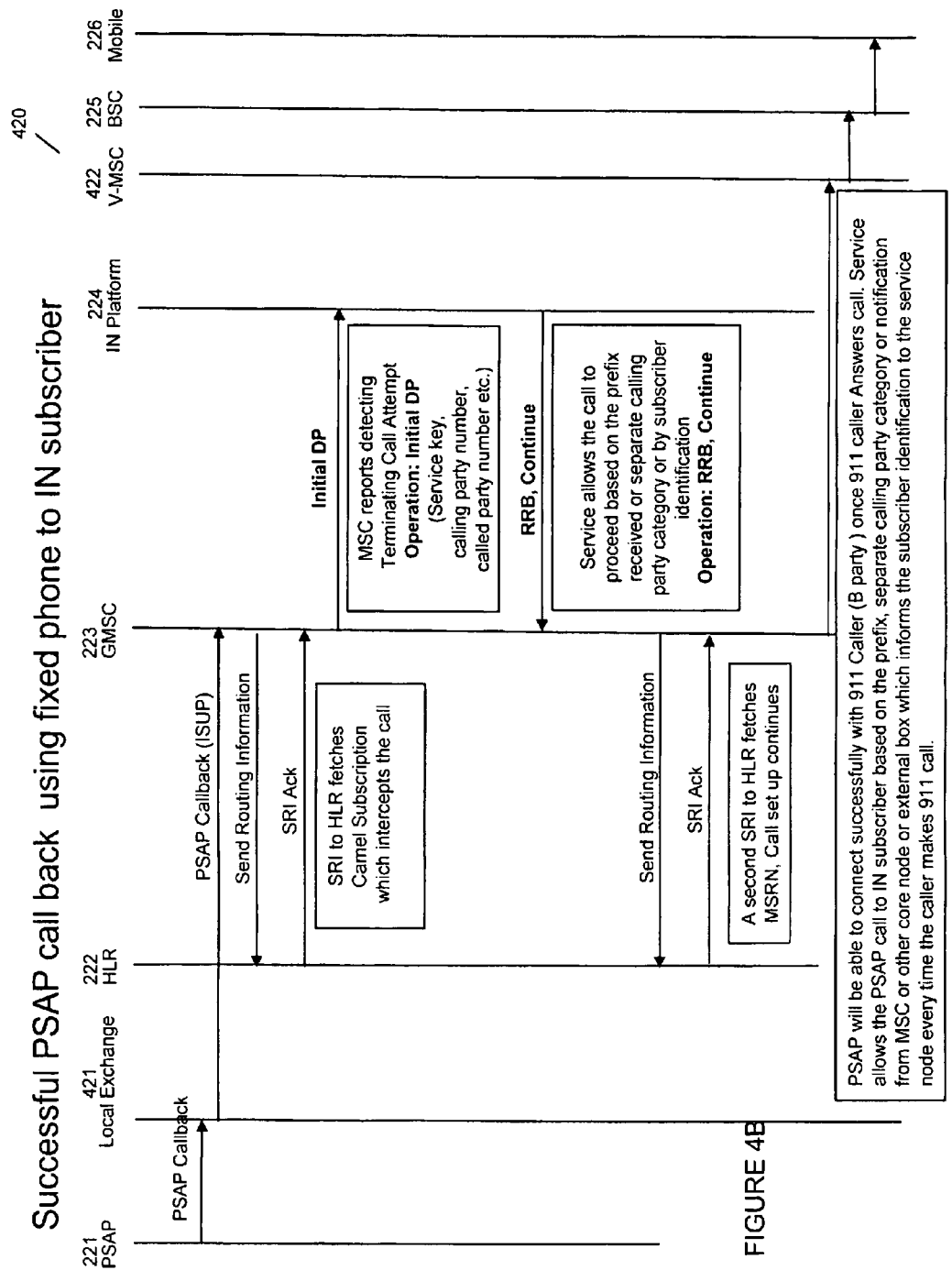
FIG. 4B is a message flow diagram of a call from a fixed, wireline telephone of a PSAP to a terminal of a 911 caller having IN services according to an embodiment of the present invention.

FIG. 4B is a message flow diagram 420 of a call from a fixed, wireline telephone of a PSAP to a terminal of a 911 caller having IN services according to an embodiment of the present invention. As seen therein, messages flow between and among the nodes PSAP 221, local exchange 421, HLR 222, GMSC 223, IN Platform 224, V-MSC 422, BSC 225 and mobile terminal 226.

Figure 5:
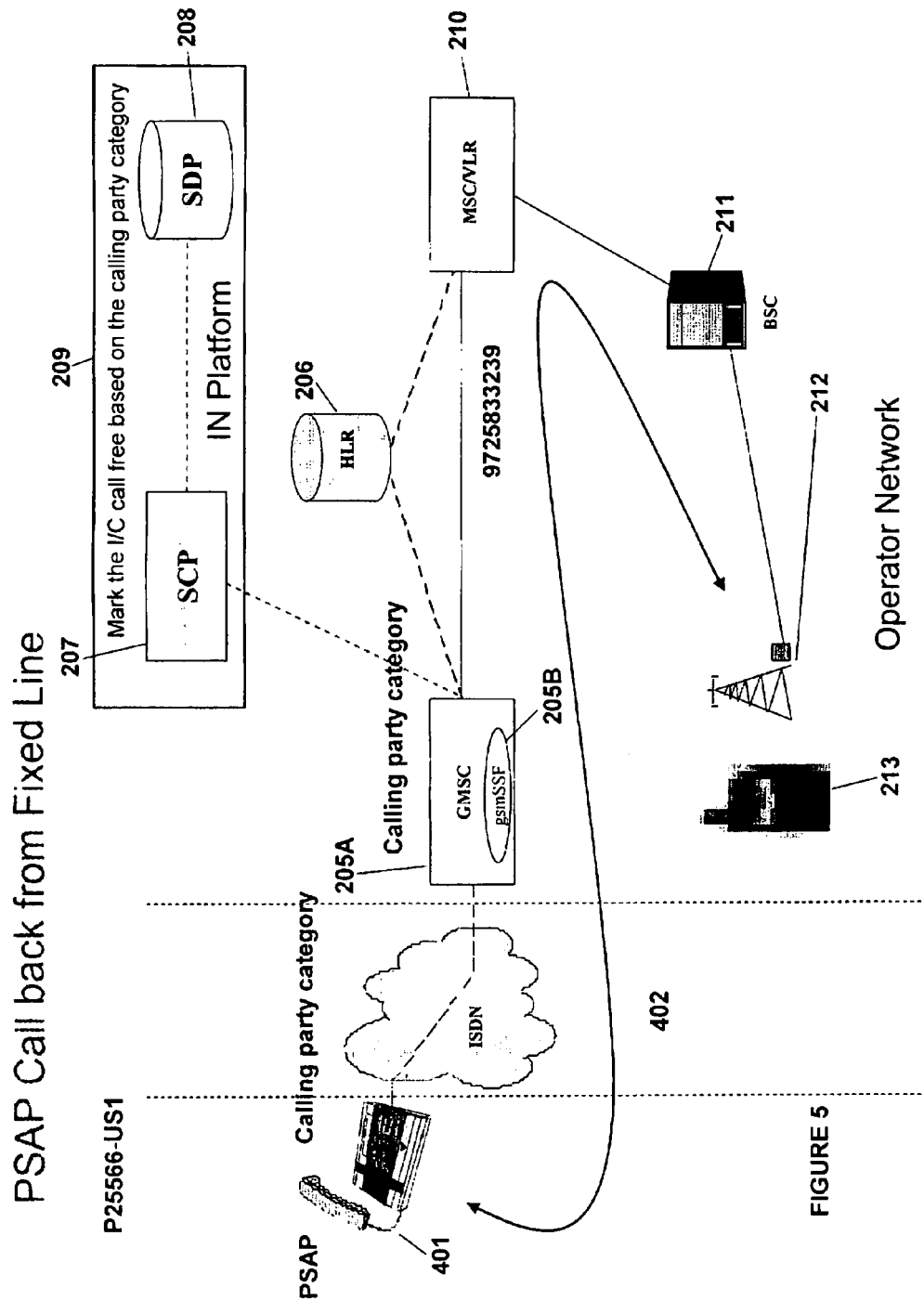
FIG. 5 is a block diagram of a call from a fixed, wireline telephone of a PSAP using a separate calling party category to a terminal of a 911 caller having IN services according to an embodiment of the present invention.

FIG. 5 is a block diagram of a call from a fixed, wireline telephone of a PSAP using a separate calling party category to a terminal of a 911 caller having IN services according to an embodiment of the present invention. In operation, the call is routed as seen in FIG. 3, provided that, initially, the PSAP, using a fixed wireline terminal 401 dials the number of the terminal of the 911 caller number with the PSAP calling category and this, along with the MSISDN reaches the LEC 402. The LEC uses data translations to receive the category, analyze the category and route them through the IXC as needed so that the complete category plus the MSISDN reaches the GMSC 205A used by the terminal of the B-subscriber.

There are numerous advantages associated with the present invention. It improves the ability of a PSAP to respond to a terminal of a 911 caller who has subscribed to IN services, it works when the terminal of the 911 caller is in a roaming mode, and it is efficiently and cost effectively implemented in a telecom service provider network as it only involves data translation changes to receive the prefix <MSISDN> and treat the digits as needed.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method of establishing a connection from a Public Safety Answering Point (PSAP) to a terminal subscribed to Intelligent Network (IN) services, comprising the steps of:
   receiving by the PSAP, a call report with the number of the terminal, wherein the number is a Mobile Station International Subscriber Directory Number (MSISDN);
   adding a prefix to the calling party MSISDN (collectively, "digits") to connect the call to the terminal;
   receiving the digits, via a Base Station (BS) and a Base Station Controller (BSC) in a Visiting Mobile Switching Center (V-MSC);
   analyzing, by the V-MSC, the digits;
   routing the call to a Gateway Mobile Switching Center (GMSC) being used by the terminal without stripping or altering the digits;
   performing B-number (called party number) and Signaling Connection and Control Part (SCCP) analysis at the GMSC, wherein the global title "Routing Case" provides the Signaling Point (SP) of the Home Location Register (HLR);
   sending the Mobile Application Part (MAP) message "Send Routing Information (SRI)" to the HLR by the Message Transport Part (MTP);
   receiving, at the GMSC, Terminating CAMEL Subscription Information (T-CSI) data from the HLR wherein the T-CSI data indicates that Customized Applications for Mobile Network Enhanced Logic (CAMEL) services are to be applied to mobile terminating calls and routing to the GSM Service Switching Function (gsmSSF) is invoked;
   sending a Service Key (SK) from the HLR and data for CAMEL from the gsmSSF to a Service Control Point; identifying the service to be invoked in the SCP;
   sending, by the SCP, interrogations about parameters associated with the terminal to a Service Data Point (SDP) to determine if a call is allowed and, if so, for how long; and
   addressing, in an IN platform, an A-number (calling party number) prefix in such a way that SCP always allows the connection of a call with the prefix dialed by the PSAP in the call from the PSAP to a terminal of the IN subscriber.

2. A system of establishing a connection from a Public Safety Answering Point (PSAP) to a terminal subscribed to Intelligent Network (IN) services, comprising:
   means for receiving by the PSAP, a call report with the number of the terminal;
   means for adding a prefix to the calling party MSISDN (collectively, "digits") to connect the call to the terminal;
   means for receiving the digits, via a Base Station (BS) and a Base Station Controller (BSC) in a Visiting Mobile Switching Center (V-MSC);
   means for analyzing, by the V-MSC, the digits;
   means for routing the call to a Gateway Mobile Switching Center (GMSC) being used by the terminal without stripping or altering the digits;
   means for performing B-number (called party number) and Signaling Connection and Control Part (SCCP) analysis at the GMSC, wherein the global title "Routing Case" provides the Signaling Point (SP) of the Home Location Register (HLR);
   means for sending the Mobile Application Part (MAP) message "Send Routing Information (SRI)" to the HLR by the Message Transport Part (MTP);

means for receiving, at the GMSC, Terminating CAMEL Subscription Information (T-CSI) data from the HLR wherein the T-CSI data indicates that Customized Applications for Mobile Network Enhanced Logic (CAMEL) services are to be applied to mobile terminating calls and routing to the GSM Service Switching Function (gsmSSF) is invoked;

means for sending a Service Key (SK) from the HLR data for CAMEL from the gsmSSF to a Service Control Point; means for identifying the service to be invoked in the SCP;

means for sending, by the SCP, interrogations about parameters associated with the terminal to a Service Data Point (SDP) to determine if a call is allowed and, if so, for how long; and means for addressing, in an IN platform, an A-number (calling party number) prefix in such a way that SCP always allows the connection of a call with the prefix dialed by the PSAP in the call from the PSAP to a terminal of the IN subscriber.

* * * * *

UNITED STATES PATENT AND TRADEMARK OFFICE
CERTIFICATE OF CORRECTION

PATENT NO. : 8,396,444 B2  Page 1 of 1
APPLICATION NO. : 12/098553
DATED : March 12, 2013
INVENTOR(S) : Jayanna It is certified that error appears in the above-identified patent and that said Letters Patent is hereby corrected as shown below:

In the Specifications:

In Column 3, Lines 16-17, delete "wireless." and insert -- wireless, --, therefor.

In Column 3, Line 32, delete "services:" and insert -- services; --, therefor.

In Column 3, Line 45, delete "invention." and insert -- invention; --, therefor.

In Column 4, Line 33, after "how long.", insert -- In the --.

In Column 4, Line 42, delete "211." and insert -- 211, --, therefor.

In Column 4, Line 47, delete "224" and insert -- 224, --, therefor.

In Column 5, Line 18, delete "B-subscriber" and insert -- B-subscriber, --, therefor.

In Column 5, Line 19, delete "MSCNLR" and insert -- MSC/VLR --, therefor.

In Column 5, Line 46, delete "fixed" and insert -- fixed, --, therefor.

In the Claims:

In Column 7, Lines 10-11, in Claim 2, delete "means for.........the SCP;" and insert the same at Line 11, as a new sub-point.

Signed and Sealed this
Eighteenth Day of June, 2013

Teresa Stanek Rea
*Acting Director of the United States Patent and Trademark Office*